H. G. MALGADY.
CAR DOOR.
APPLICATION FILED MAR. 28, 1912.
1,033,026.
Patented July 16, 1912.
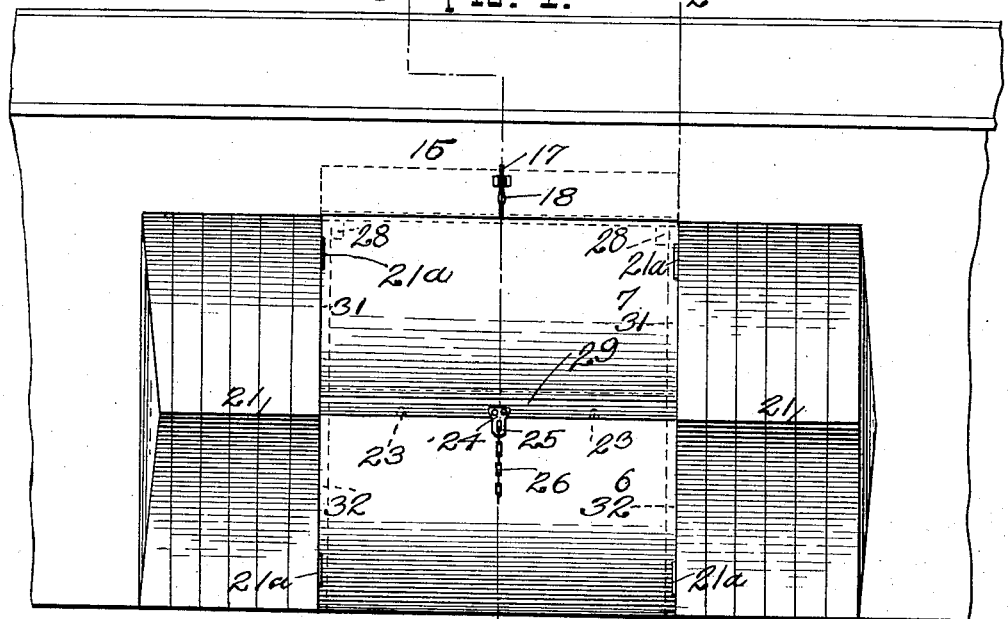
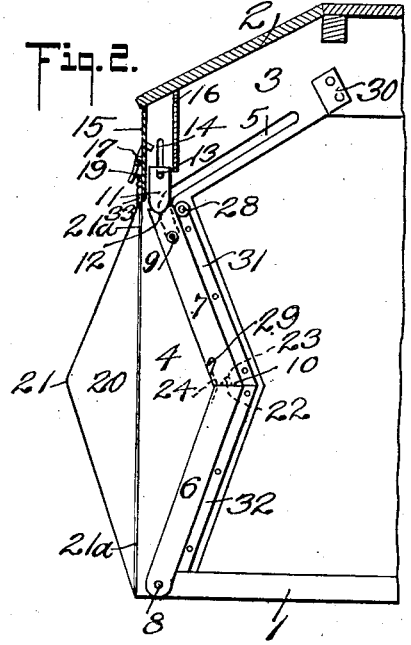
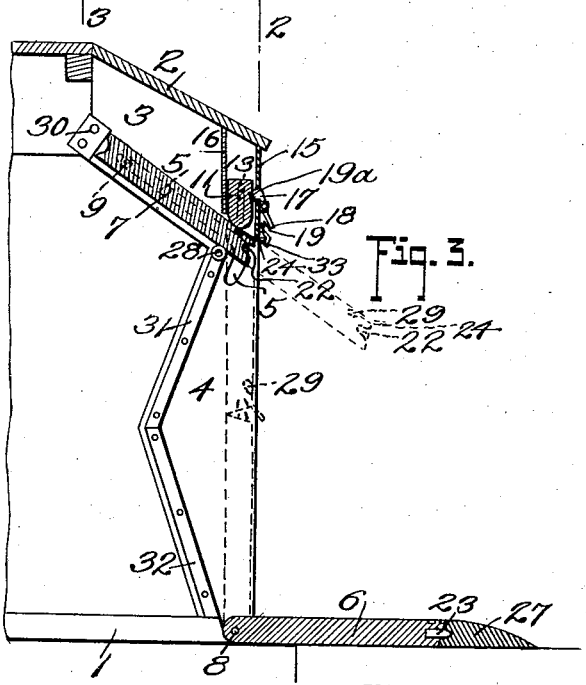
Witnesses
L. H. Wagner,
G. W. Kirkley
INVENTOR
Henry G. Malgady
By Beaver & Robb
Attorneys

UNITED STATES PATENT OFFICE.

HENRY G. MALGADY, OF JERSEY CITY, NEW JERSEY.

CAR-DOOR.

1,033,026.　　　　Specification of Letters Patent.　　Patented July 16, 1912.

Application filed March 28, 1912.　Serial No. 686,849.

*To all whom it may concern:*

Be it known that I, HENRY G. MALGADY, a citizen of the United States, residing at Jersey City, in the county of Hudson and State of New Jersey, have invented certain new and useful Improvements in Car-Doors, of which the following is a specification.

The present invention relates to car doors, and has particular reference to a construction of doors which is especially adapted for use on freight cars carrying valuable goods.

The invention also relates to that class of car doors in which the lowermost of two conjointly acting doors is adapted to serve as an unloading platform.

The object of the invention is to provide a construction of car doors, which may be applied to the ordinary existing forms of freight cars without necessitating any change in the original structure of the cars, it being possible to build the supporting frame forming a part of the structure hereinafter disclosed into any car.

A further object of the invention is to so construct a car door that the same cannot be opened unless the car is in a position beside an unloading platform at a station, it being impossible to manipulate the doors from the ground.

According to the construction forming the present invention, the two coacting car doors are held in closed position by means of a weight arranged to bear upon the uppermost of the two doors, said weight being movable up and down in a suitable guideway, and means are provided for engaging the weight when in its uppermost position. When the doors are to be opened, a pull in an outward direction is exerted at the point of mutual engagement of the two doors, the lowermost door being then swung down into a horizontal position on a station platform. Means are also provided for swinging the uppermost door on its pivots and up into a position where it will be out of the way so as not to interfere with the operation of unloading the car.

For a full understanding of the present invention, reference is to be had to the following description and to the accompanying drawings, in which—

Figure 1 is a side elevation of a car fitted with my improved door construction. Fig. 2 is a vertical section taken about on the line 2—2 of Fig. 1, looking toward the left. Fig. 3 is a vertical section of the device taken about on the line 3—3 of Fig. 1, looking to the right.

Throughout the following detail description and on the several figures of the drawings, similar parts are referred to by like reference characters.

Referring now particularly to the drawings, 1 indicates the floor of a freight car of ordinary construction and 2 the roof thereof. Upper side partitions 3 for the reception of the essential operating members forming the present invention are provided and are preferably connected with the car roof 2, it being possible to build these partitions at the sides of the door-way of a car of the ordinary construction. Lower partitions 4 are so constructed as to be practically in alinement with the partitions 3, the partitions 4 forming a housing or casing for the coacting doors. In each of the partitions 3 and on either side of the coacting car doors hereinafter referred to is cut a slot or channel 5 extending throughout the greater part of its length in a direction somewhat inclined to a horizontal plane and being preferably straight throughout such position, said slot or channel being curved in a downward direction at its lower end, as will be seen upon reference to Figs. 2 and 3.

I will now proceed to the description of the particular form of doors constructed according to the present invention. These consist of a lower or platform section 6 and an upper section 7, the section 6 being permanently pivoted to the partition 4 at point 8 and the section 7 having bearings 9 which are adapted to move in the slots or channels 5. When in closed position, the two door sections have the relative positions shown in Fig. 2, each section being somewhat inclined from a vertical plane, the doors engaging each other at their ends 10. A weight 11 having its width about equal to that of the door-way of the car and having its cross section of about the shape shown in Figs. 2 and 3, is arranged in a position above the door section 7, and normally bears on said section. The door section 7 is recessed at its upper end at 12 for the reception of the weight 11. The weight is provided at each end with a bearing 13 movable in a slotted guide-way 14 formed in each of the partitions 3. A housing or casing for the reception of the weight 11 is formed by the sides 15 of the car and a wall 16 which depends from the car roof 2 and extends to a point near the slot or channel 5.

Mounted on the side wall 15 of the car is a dog 17 having its engaging end normally projecting within the car and having its outer end 18, which is in a position on the outside of the car, acted upon by a spring 19, which tends to maintain the dog in the position shown in Figs. 2 and 3 where it can engage the weight 11. Said weight is provided at a point on its front face with a recess 19$^a$ which is adapted to be engaged by the dog, so the weight will be held in a raised position for a purpose hereinafter referred to.

A pair of outer swinging doors 20 are provided to cover the door sections 6 and 7, the doors 20 being hinged to the sides of the car at 21$^a$. Each of these doors is rectangular in side view but is made thick at its central point 21, from which point the thickness decreases, the shape of the doors being apparent from Fig. 2. The doors 20 having this construction serve to maintain a close contact with the door sections 6 and 7 when in their closed position and effectively protect the latter from bad weather.

The door section 7 is provided on its lower end 10 with a plurality of recesses 22 which engage correspondingly placed projections 23 which are arranged upon the upper end of the door section 6. When the door sections 6 and 7 are in their closed position, they are securely held in said position by the projections 23 entering the recesses 22.

Secured to the lower edge of the door section 7 at approximately a central point thereof, and on the outer side of said section, is a hasp 24 which extends somewhat over the lower edge of the door section 6, so as to engage a hook 25 thereon, by which means, the fastening of the doors 6 and 7 may be completed. Attached to the hasp 24 is a chain 26, as will be seen upon reference to Fig. 1. When it is desired to open the doors 6 and 7, the outer doors 20 are first swung to their open position, as shown in Fig. 1, and after the hasp 24 has been unfastened from its engagement with the hook 25 upon the lower door section 6, an outward pull exerted upon the chain 26, and of course, transmitted to the door section 7, will result in the two door sections assuming the vertical positions indicated by dotted lines in Fig. 3. A slotted channel 29 extending longitudinally across the door section 7 near the lower end thereof is provided for the insertion of the fingers in order to apply more force to the operation of opening the door than can be exerted upon the chain 26. That is, the combined means provided by the chain and the channel are usually employed when opening the doors. As the combined height of the doors in their vertical position will obviously be greater than when the doors are in the closed position shown in Fig. 2, the weight 11, which normally bears upon the door section 7 will be forced upwardly to the position shown in Fig. 3, it sliding upwardly in the guide-way 14. When the weight 11 has risen to the position where its recess 19$^a$ is opposite the inner projecting end of the dog 17, said projecting end of the latter will be forced into the recess by the action of the spring 19, and the weight will be held in the upward position shown in Fig. 3 until released by pressure on the arm 18, exerted manually outside the car. The door sections being in the position shown by dotted lines in Fig. 3 and the weight 11 in its uppermost locked position, the door section 6 will be swung downwardly into a substantially horizontal plane where, by having a portion of its body supported by the station platform, it will act as an unloading platform. An auxiliary member 27 having its upper surface of curved contour may be moved against the door section 6 when in its downward horizontal position, in order to provide an easy passage for trucks when unloading the car. After the door section 6 has been moved into the vertical position shown, the upper door section is forced at first in an upward direction, the bearings 9 of the door section moving through the lower curved portion of the slot or channel 5 until they reach the straight portion of said channel. The door section 7 is then swung about its pivot bearings 9 into an inclined direction, such as is shown by the dotted lines in Fig. 3 and further upward pressure in this direction will result in the door section assuming the position shown in full lines in Fig. 3, the weight 11 being meanwhile in a position so as not to interfere with the movement of the door section in its channel.

In order to facilitate the movement of the door section 7, I have provided rollers 28 which are mounted upon the side partitions 4 and upon which the door begins to bear when moved to the dotted line position of Fig. 3. I further provide stops 30 which are fastened to the upper side partitions 3. and are so placed to limit the movement of the door section 7 when in its uppermost position. Strips 31 and 32 having the direction shown in Figs. 2 and 3 are fastened by any suitable means to the side partitions 4 so as to afford a bearing for the door sections 6 and 7 in their closed position, and limit the inward movement of the same.

Any suitable fastening means 33 may be attached to the side 15 of the car at a point above the doorway so as to engage the hasp 24 and maintain the door section 7 in its uppermost position; that is, that shown in Fig. 3. When closing the door sections, the hasp 24 will be released from its fastening, and the upper section 7 will be pulled by the hands from its full line position in Fig. 3 into its inclined position shown in dotted lines in said figure, at which time its bearings 9 will be at a point in the channel 5 where the latter turns from its straight course into its downwardly curved course. The lower door section 6 will then be swung upwardly into the vertical position shown in dotted lines and the section 7 will be turned by its pivotal bearings in the channel 5 in the position above mentioned, so as to assume the vertical position shown in dotted lines and have its lower inner edge engage the upper inner edge of section 6. The two door sections will then be pushed inwardly into their inclined positions shown in Fig. 2, the projections 23 engaging the recesses 22 and the hasp 24 will be fastened to the hook 25 on section 6. The bearings 9 of the door section 7 have then assumed their normal position at the lowermost end of the channel 5. Meanwhile, the weight 11 has been maintained in its raised position, shown in Fig. 3, as it is necessary to prevent it from interfering with the door section 7 during the closing operations described. However, when the doors have been pushed to their closed position in Fig. 2, the dog 17 may be released from its engagement with the weight by forcing inwardly the arm 18 of the dog against the pressure of the spring 19, allowing the weight to drop in a manner that will be obvious, and rest in the channel 12 at the upper end of the door section 7.

It must be distinctly understood that in the practical use of the invention hereinbefore described, I am not limited to the exact embodiment disclosed and illustrated, as various modifications may be made in the arrangement and relative proportions of the parts such as will fall within the scope of the appended claims without departing from the spirit of the invention or sacrificing any of its advantages.

Having thus described the invention, what is claimed as new is:

1. Car doors comprising upper and lower door sections, a partition arranged at each side of both sections, said lower section being pivotally mounted in the partitions and said upper section having movable pivotal connections with said partitions, a weight normally bearing upon the upper door section, said sections when in their closed position being adapted to engage each other and meeting at an angle, said weight being movable upwardly when the door sections are moved to a vertical position, and means for maintaining said weight in its uppermost position.

2. Car doors comprising an upper and a lower door section, a side partition arranged at each side of the doors, said lower section being pivotally mounted in said partitions, an upper partition containing a channel arranged on each side of the door sections, said channel curving downwardly at its lowermost end, a weight arranged above the upper door section and bearing upon the same when the doors are closed, a guide-way in which said weight is movable, said door sections when in their closed position engaging each other at an angle, said weight being movable upwardly in its guide-way when the door sections are moved into a vertical position, bearings for said upper door section pivotally mounted in said channel, said upper door section being movable on its pivotal bearings into an upwardly inclined position, means for maintaining said weight in its raised position, and stops for limiting the upward movement of said upper door section.

3. Car doors comprising an upper and a lower door section, a weight normally bearing upon the upper door when the doors are in closed position, said upper door being capable of movement in an upwardly inclined direction, means for maintaining said upper door in its upwardly inclined position, said weight being capable of upward movement, and means for retaining said weight in its raised position, said lower door section being capable of outward swinging movement into an approximately horizontal plane to serve as an unloading platform.

4. Car doors comprising an upper and a lower door section, a weight normally bearing upon the upper door when the doors are in closed position, said upper door being capable of movement in an upwardly inclined direction, means for maintaining said upper door in its upwardly inclined position, said weight being capable of upward movement, means for retaining said weight in its raised position, said lower door section being capable of outward swinging movement into an approximately horizontal plane to serve as an unloading platform, said upper and lower sections being inwardly inclined and engaging each other when in their closed position, and a pair of outer doors adapted when closed to cover said door sections, said outer doors being so formed as to conform to the inclined position of the upper and lower door sections.

5. Car doors comprising an upper and a lower door section, a partition arranged on each side of said door sections, a weight arranged above the upper door section longitudinally thereof and bearing on the same when the doors are in closed position, a guide-way in which said weight is movable up and down, said weight being provided with a recess, a spring actuated dog adapted to engage said recess to hold said weight in its raised position, a guide-way in which said upper door section is movable, said upper and lower door sections engaging each other when in their closed position and being angularly inclined to each other, one of said doors being provided at its engaging face with projections and the other door section with recesses in which said projections engage, the door sections being capable of movement from their angularly inclined position into a vertical position, and said upper section being capable of movement from its vertical position into an upwardly inclined position, means for retaining the upper door section in such position, and a stop for limiting further movement thereof.

6. Car doors comprising upper and lower door sections, members in which said door sections are mounted, a weight arranged above the upper door section and bearing thereon when the door sections are in closed position, means enabling said weight to move up and down, said door sections engaging each other when in their closed position, and means allowing the movement of the upper door section into an uppermost inclined position.

7. Car doors comprising upper and lower door sections, members in which said door sections are mounted, a weight arranged above the upper door section and bearing thereon when the door sections are in closed position, means enabling said weight to move up and down, said door sections engaging each other when in their closed position, means allowing the movement of the upper door section into an uppermost inclined position, means for engaging said weight when moved upwardly by the upper door section and retaining it in its raised position, and means for holding the upper door section in its uppermost inclined position.

8. Car doors comprising upper and lower door sections, members in which said door sections are mounted, a weight arranged above the upper door section and bearing thereon when the door sections are in closed position, means enabling said weight to move up and down, said door sections engaging each other when in their closed position, and means allowing the movement of the upper door section into an uppermost inclined position, the lower door section being adapted to be swung downwardly into an approximately horizontal plane when released from its engagement with the upper door section to serve as an unloading platform.

In testimony whereof I affix my signature in presence of two witnesses.

HENRY G. MALGADY.

Witnesses:
THOMAS GRIFFIN,
JOE DALY.